United States Patent
Takahashi et al.

(10) Patent No.: US 7,913,794 B2
(45) Date of Patent: Mar. 29, 2011

(54) HOOD AIRBAG DEVICE FOR USE IN A VEHICLE

(75) Inventors: Hiroyuki Takahashi, Aichi-ken (JP); Takayuki Takimoto, Tokyo (JP)

(73) Assignees: Toyota Jidosha Kabushiki Kaisha, Toyota-shi, Aichi-ken (JP); Takata Corporation, Tokyo (JP)

( * ) Notice: Subject to any disclaimer, the term of this patent is extended or adjusted under 35 U.S.C. 154(b) by 291 days.

(21) Appl. No.: 12/160,238

(22) PCT Filed: Jan. 4, 2007

(86) PCT No.: PCT/IB2007/000011
§ 371 (c)(1),
(2), (4) Date: Jul. 8, 2008

(87) PCT Pub. No.: WO2007/085918
PCT Pub. Date: Aug. 2, 2007

(65) Prior Publication Data
US 2009/0066069 A1    Mar. 12, 2009

(30) Foreign Application Priority Data
Jan. 25, 2006  (JP) .................................. 2006-016596

(51) Int. Cl.
*B60R 21/34* (2011.01)
(52) U.S. Cl. ................... 180/274; 280/728.2; 280/730.1
(58) Field of Classification Search .................. 180/274; 280/728.2, 728.3, 730.1; 296/187.04, 193.11
See application file for complete search history.

(56) References Cited

U.S. PATENT DOCUMENTS

| | | | |
|---|---|---|---|
| 6,827,170 B2 | 12/2004 | Hamada et al. | |
| 6,857,495 B2 * | 2/2005 | Sawa | 180/274 |
| 6,920,954 B2 * | 7/2005 | Hashimoto et al. | 180/274 |
| 2005/0206139 A1 | 9/2005 | Mori et al. | |
| 2009/0033071 A1 * | 2/2009 | Takimoto et al. | 280/728.2 |
| 2009/0229906 A1 * | 9/2009 | Takahashi et al. | 180/274 |
| 2010/0156070 A1 * | 6/2010 | Takahashi et al. | 280/728.3 |

FOREIGN PATENT DOCUMENTS

| | | |
|---|---|---|
| CN | 101287628 | 10/2008 |
| JP | 7-125609 | 5/1995 |
| JP | 8-11662 | 1/1996 |
| JP | 3245489 | 10/2001 |

(Continued)

OTHER PUBLICATIONS

Machine Translation of JP 8-11662.*

(Continued)

*Primary Examiner* — Toan C To
*Assistant Examiner* — Joseph Rocca
(74) *Attorney, Agent, or Firm* — Finnegan, Henderson, Farabow, Garrett & Dunner, LLP (57) ABSTRACT

In a hood airbag device (10) for use in a vehicle, an airbag module (14) is installed in a hood (12) of the vehicle from below an inner hood panel (12) and a door (18) for covering an opening (22A) in an outer panel (24) is mounted thereto independently of the airbag module (14). Accordingly, it is possible to prevent the outer hood panel (12) from being damaged when the airbag module (14) is installed, and also readily performed a fine adjustment of a dimensional deviation when the door (18) is mounted, so that the installability of the airbag module (14) and the door (18) can be significantly enhanced.

15 Claims, 5 Drawing Sheets

FOREIGN PATENT DOCUMENTS

| | | |
|---|---|---|
| JP | 2003-104144 | 4/2003 |
| JP | 2005-254988 | 9/2005 |
| JP | 2005-271645 | 10/2005 |
| JP | 2005-343198 | 12/2005 |
| WO | WO 2007/042908 A1 | 4/2007 |
| WO | WO 2007/045956 A1 | 4/2007 |

OTHER PUBLICATIONS

Notification of the First Office Action for CN 200780003182.6 dated Mar. 17, 2010.

"Notification Concerning Rejection Reason" dated Dec. 25, 2007, in Japanese Patent Application No. 2006-016596, filed Jan. 25, 2006.

* cited by examiner

HOOD AIRBAG DEVICE FOR USE IN A VEHICLE

CROSS-REFERENCE TO RELATED APPLICATIONS

This application is a national phase application of International Application No. PCT/IB2007/000011, filed Jan. 4, 2007, and claims the priority of Japanese Application No. 2006-016596, filed Jan. 25, 2006, the content of both of which is incorporated herein by reference.

BACKGROUND OF THE INVENTION

1. Field of the Invention

The present invention relates to a hood airbag device that deploys an airbag over a hood of a vehicle.

2. Background of the Invention

Japanese Patent Application Publication No. JP-A-2005-271645 describes an airbag module that is accommodated in the rear portion of the hood of a vehicle and a door, assembled in advance, to the airbag module that openably closes an opening extending in a width direction of the vehicle at the rear portion of the hood.

Typically, the airbag module of the hood airbag device has an elongated shape and a heavyweight nature. As in the above-cited reference, when the airbag device is structurally designed such that the airbag module with the door is to be installed into the hood by inserting the same through the opening of the hood from above and, the opening is formed in a small size, for example, in consideration of an appearance, i.e., design of the hood, the airbag module suffers from deteriorated installability and is likely to damage the ornamental surface of an external hood panel in the installation process.

SUMMARY OF THE INVENTION

The present invention provides a hood airbag device that significantly improves the installability of an airbag module and a door when they are mounted into a hood of a vehicle.

In accordance with a first aspect of the present invention, there is provided a hood airbag device for use in a vehicle, including: an airbag module having an inflator and an airbag adapted to be deployed by a gas supplied from the inflator, the airbag module is provided between an outer hood panel and an inner hood panel of the hood through the inner hood panel, the airbag module is installed on a reinforcement and the inner hood panel, the reinforcement connecting the inner hood panel with the outer hood panel and reinforcing the hood; and a door for covering an opening formed in the outer hood panel that is aligned to correspond to the airbag module. The door is held in place on the peripheral portion around the opening in such a manner that, when the airbag is inflated the force of the inflating airbag unfolds the door, which opens the opening.

In such a hood airbag device, the door that closes the opening of the outer hood panel is mounted on the outer hood panel from above and the airbag module is installed into the hood through the inner hood panel. This drastically improves the installability of the airbag module and the door when they are fitted into the hood.

Further, it is preferred that the door has a hinge for supporting the door when the door is unfolded. The hinge may be less rigid than the door so that the hinge is plastically deformed with ease in response to the unfolding of the door. The hinge may be provided with a deformable portion, as a spare extensible part for securing a deformation stroke thereof, and may be connected to the reinforcement by means of a connector member such that the hinge is relatively displaceable within a predetermined range with respect to the reinforcement.

In the hood airbag device described above, the hinge of the door is connected to a reinforcement by means of the connector member in a floating condition such that it can be relatively displaced with respect to the reinforcement. This makes it possible to accommodate the dimensional deviation between the door and the outer hood panel upon their assembling process. Thus, there is no need to take into account the dimensional deviation when assembling the airbag module and when installing the airbag module into the hood. This helps to further enhance the mountability of the door when it is mounted to the outer hood panel.

Furthermore, in the hood airbag device described above, because the hinge is less rigid than the door, the hinge is plastically deformed to support the door in the opened state as the door is pushed upwardly by the force of the inflating airbag. The deformable portion as a spare extensible part is extended in response to the unfolding of the door, thereby allowing the door to be reversed onto the outer hood panel about the hinge. This makes it possible, when the airbag is inflated, to unfold and open the door while the door is supported by the hinge.

In accordance with a second aspect of the present invention, there is provided a hood airbag device for use in a vehicle, including: an airbag module having an inflator and an airbag adapted to be deployed by a gas supplied from the inflator, the airbag module is provided between an outer hood panel and an inner hood panel of the hood through the inner hood panel, the airbag module installed in the inner hood panel; and a door, pre-assembled to the airbag module, for closing an opening formed in the outer hood panel that is aligned to correspond to the airbag module, wherein the door is adapted to unfold and open by the force of the inflating airbag when the airbag is deployed and has a sealing surface formed in such a manner that a sealing member is disposed between the sealing surface and a peripheral edge of the opening.

In the hood airbag device of the second aspect, the airbag module having the door pre-assembled thereto is inserted and installed in the hood through the inner hood panel. This eliminates the possibility that the external surface of the outer hood panel is inadvertently damaged during the installation process, which makes it possible to maintain the design integrity of the hood and hence to improve the external appearance quality of the vehicle.

In the hood airbag device of the second aspect, the door has a hinge with a smaller rigidity than the door that supports the door when the door is unfolded. Because the hinge is less rigid than the door, it is plastically deformed with ease in response to the unfolding of the door. In addition, the hinge may be provided with a deformable portion as a spare extensible part that secures a deformation stroke thereof. The hinge is connected to the airbag module.

In the hood airbag device described above, the hinge, which is less rigid than the door, is plastically deformed to support the door in an opened state as the door is pushed upward by the force of the inflating airbag. The deformable portion as the spare extensible part is extended in response to the unfolding of the door, thereby allowing the door to be reversed onto the outer hood panel about the hinge. This makes it possible, when the airbag is inflated, to unfold and open the door while the door is supported by the hinge.

Preferably, the hood airbag device of the second aspect further includes a reinforcement that connects the inner hood panel with the outer hood panel and that reinforces the hood, the airbag module is installed on the reinforcement and the inner hood panel.

In the hood airbag device described above, the inner hood panel and the outer hood panel are interconnected by the reinforcement and the airbag module is installed on the reinforcement and the inner hood panel. This makes the portion of the hood to which the airbag module is installed more rigid.

In the hood airbag device of the first aspect and the second aspect, preferably, the inner hood panel and the reinforcement have an insertion aperture through which the airbag module is inserted and installed in place, the insertion aperture having a greater size in the longitudinal direction of the vehicle than the width of the opening of the outer hood panel.

In the hood airbag device described above, the airbag module insertion aperture formed in the inner hood panel and the reinforcement has a width in the longitudinal direction of the vehicle greater than that of the opening of the outer hood panel. Not only does this improve the installability of the airbag module but also it allows the airbag module to have an increased front-rear dimension and a relatively low height.

Moreover, in the hood airbag device described above, the width of the opening of the outer hood panel in the longitudinal direction of the vehicle can be reduced to maintain design integrity, while making the height of the airbag module small. This enhances the installability of the airbag module into the vehicle.

In the hood airbag device of the second aspect, preferably, the inner hood panel has an insertion aperture through which the airbag module is inserted and installed in place, the insertion aperture having a greater size in the longitudinal direction of the vehicle than the width of the opening of the outer hood panel.

In the hood airbag device described above, the airbag module insertion aperture formed in the inner hood panel and the reinforcement has a width in the longitudinal direction of the vehicle that is greater than that of the opening of the outer hood panel. Not only does this improve the installability of the airbag module but also it allows the airbag module to have an increased front-rear dimension and a relatively small height.

Additionally, in the hood airbag device as described above, the width of the opening of the outer hood panel in the longitudinal direction of the vehicle can be reduced to maintain design integrity, while making the height of the airbag module small. This enhances the installability of the airbag module into the vehicle.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE INVENTION

Hereinafter, there will be described preferred embodiments of the present invention with reference to the accompanying drawings.

Figure 1:
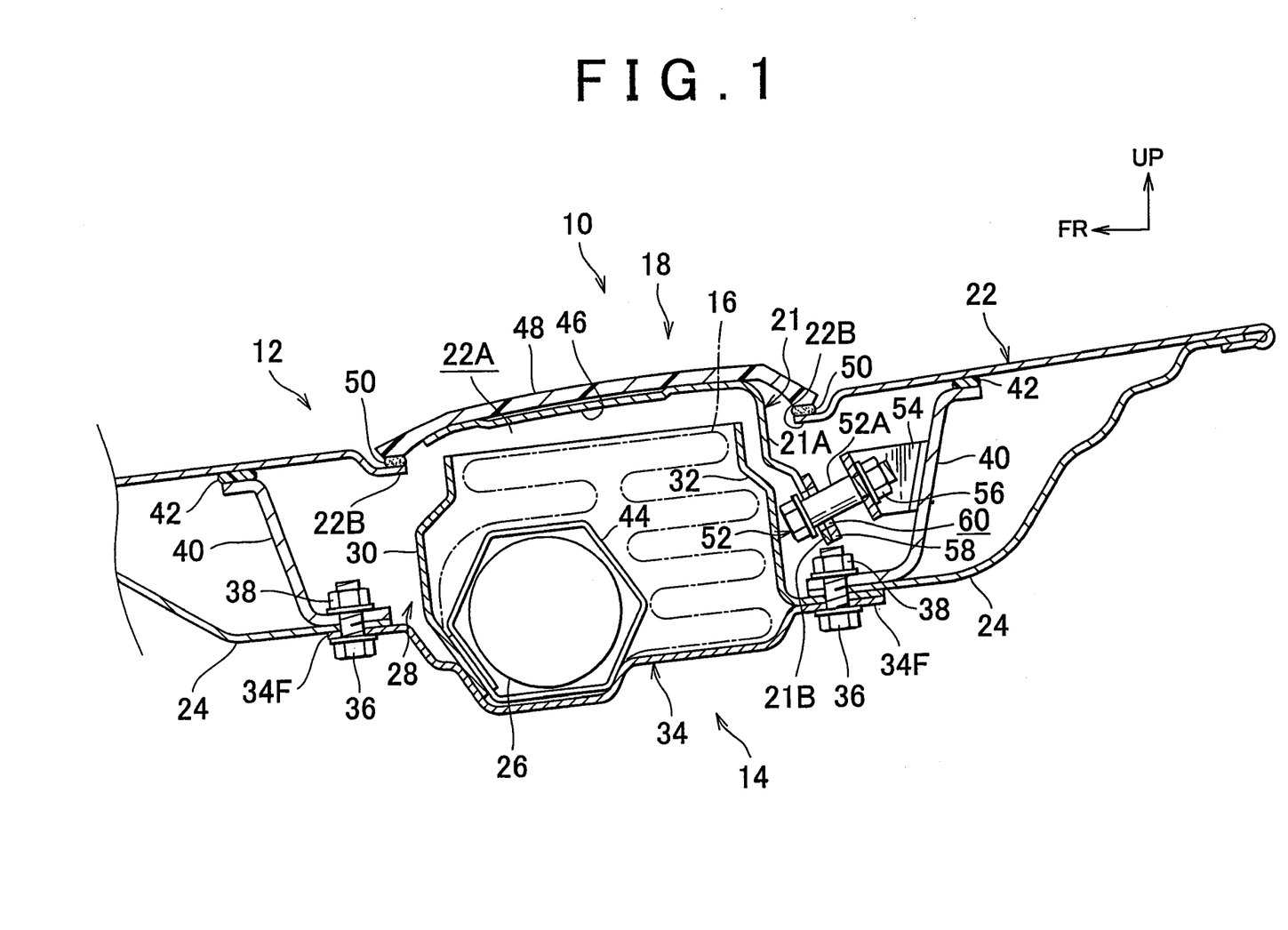
FIG. 1 is a cross-sectional view of a hood airbag device in accordance with a first embodiment of the present invention when the airbag is not deployed, which is taken along a line passing through a hinge in a longitudinal direction of the vehicle.

Referring to FIG. 1, a hood airbag device 10 in accordance with a first preferred embodiment of the present invention is provided in, e.g., a front hood 12 of a vehicle and includes an airbag module 14 and a door 18.

Figure 2:
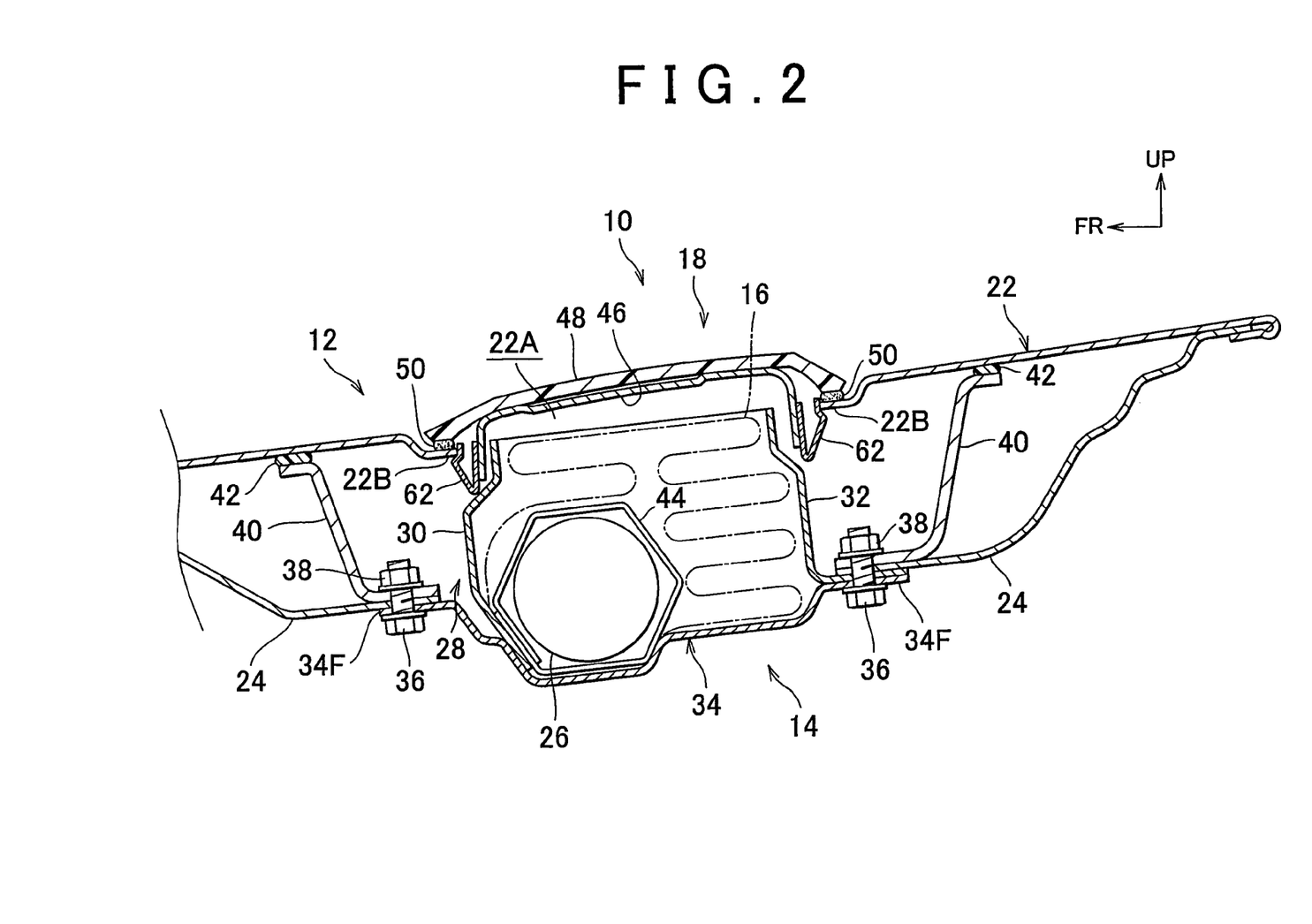
FIG. 2 is a cross-sectional view of the hood airbag device of the first embodiment when the airbag is not deployed, which is taken along a line passing through a clip in the longitudinal direction of the vehicle.
Figure 3:
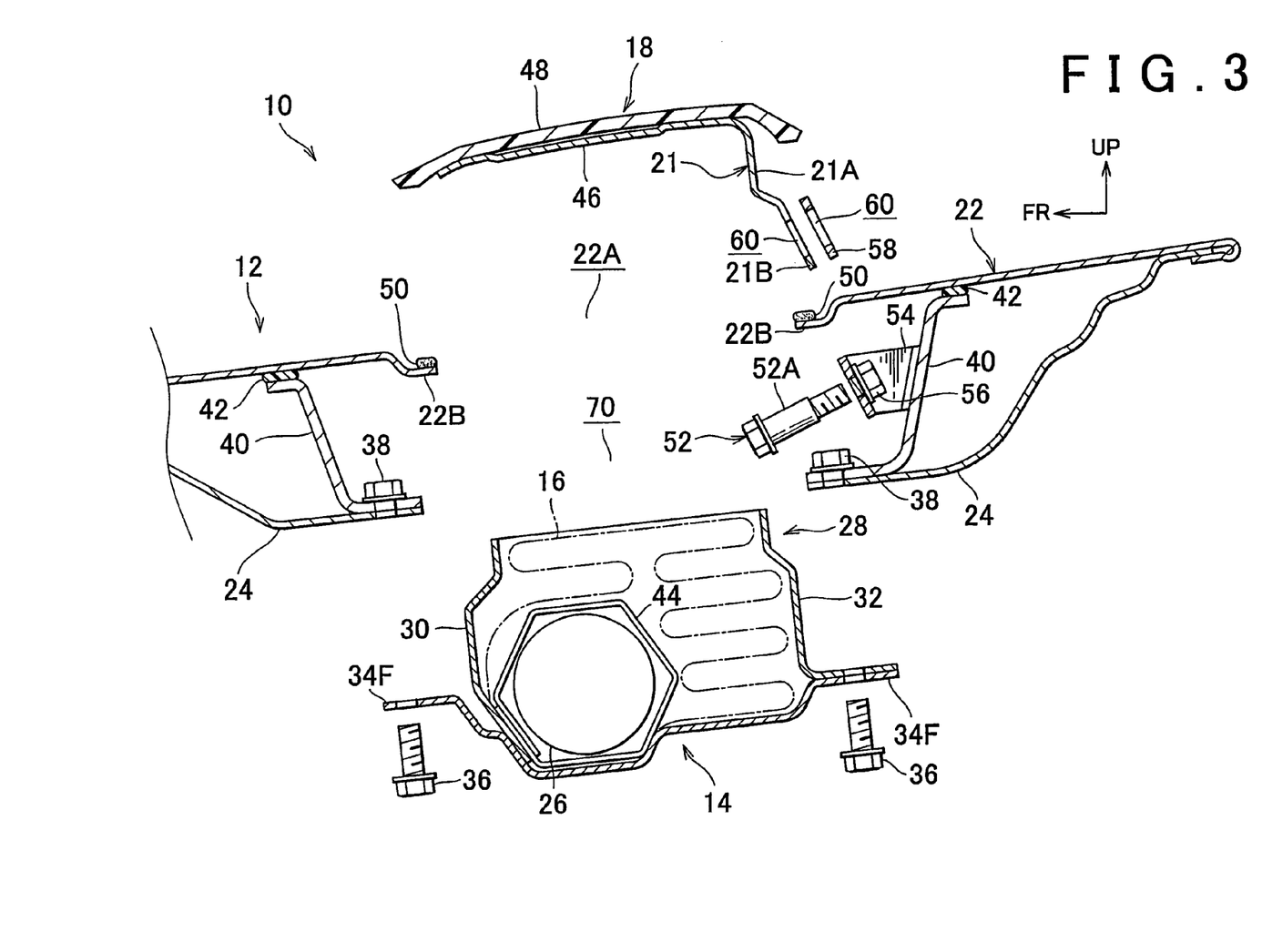
FIG. 3 is an exploded cross-sectional view depicting the hood airbag device of the first embodiment, which is taken along the line passing through the hinge in the longitudinal direction of the vehicle.

As can be seen in FIGS. 1 through 3, the airbag module 14 has an airbag 16 that can be deployed by the gas supplied from an inflator 26. The airbag module 14 is inserted between an outer hood panel 22 and an inner hood panel 24 of the hood 12 from below the inner hood panel 24. The airbag module 14 is attached to a reinforcement 40 and the inner hood panel 24. The reinforcement 40 connects the inner hood panel 24 with the outer hood panel 22 and reinforces the hood 12. The airbag 16 and the inflator 26 are all accommodated within a module case 28. The airbag 16 is may be inflated by gas supplied from the inflator 26 to deploy the airbag outside the hood 12 by expanding through an opening 22A of the outer hood panel 22.

The module case 28 is a box-like member that opens toward the opening 22A of the outer hood panel 22 and extends in a width direction of the vehicle. More specifically, the module case 28 is formed into a box-like shape by, e.g., welding a front-side wall member 30, a rear-side wall member 32 and a bottom member 34 together. The bottom member 34 is provided with flange portions 34F respectively extending in the forward direction of the vehicle from the front-side wall member 30 and in the rearward direction of the vehicle from the rear-side wall member 32. The flange portions 34F of the module case 28 in the airbag module 14 are assembled and fastened to the inner hood panel 24 together with the reinforcement 40 by means of bolts 36 and nuts 38.

Furthermore, the bottom member 34 is provided with a recessed portion which recessed downwardly, and the lower part of the inflator (26) is accommodated in the recessed portion. The recessed portion protrudes below the inner hood panel (24).

The reinforcement 40 is of an inverted hat shape in cross-section and extends in the vehicle width direction between the outer hood panel 22 and the inner hood panel 24. Furthermore, the reinforcement 40 is directly coupled to the inner hood panel 24 and supports the outer hood panel 22 through, e.g., a mastic 42.

The inflator 26 accommodated within the module case 28 is a gas source for supplying an inflating gas to the airbag 16 when an impact object (not shown) collides against the frontal area of the vehicle. The inflator 26 is fixedly secured by means of, e.g., a mounting bracket 44, to the bottom member 34 of the module case 28 in vicinity of the front-side wall member 30.

As shown in FIG. 3, an insertion aperture 70 through which the airbag module 14 can be installed in place is formed in the inner hood panel 24 and the reinforcement 40, the insertion aperture 70 is larger than the opening 22A of the outer hood panel 22 in the longitudinal direction of the vehicle.

The door 18 covers or closes the opening 22A formed in the outer hood panel 22 that is aligned to correspond to the airbag module 14 and is held in place on the peripheral portion 22B around the opening 22A of the outer hood panel 22 in such a manner that it can be unfolded by the force of the inflating airbag when it is deployed, thereby opening the opening 22A. The door 18 includes a doorframe 46 formed of, e.g., an aluminum plate or a steel plate, and a synthetic resin cover 48 fixed on the doorframe 46. As illustrated in FIG. 2, the door 18 is securely engaged with the peripheral portion 22B around the opening 22A of the outer hood panel 22 by means of a plurality of clips 62 that can be elastically deformed so that it can be detached from the outer hood panel 22. The door 18 is held by the clips 62 at a position where it closes the opening 22A. A sealing member 50 is interposed between the cover 48 and the peripheral portion 22B around the opening 22A of the outer hood panel 22. The clips 62 are affixed to, e.g., the doorframe 46, and are made to be elastically deformed to thereby be detached from the peripheral portion 22B at the moment when the force of the inflating airbag 16 is exerted on the door 18.

Referring again to FIGS. 1 and 3, a hinge 21 is connected to a stepped bolt 52, which is an exemplary connector member to the inner hood panel 24, in such a manner that it can be relatively displaced within a predetermined range with respect to the inner hood panel 24. The hinge 21 is adapted to support the door 18 when the latter is opened. The hinge 21 may be provided in plural numbers at the rear edge of the doorframe 46 of the door 18, for example, along the length of the door 18. The hinge 21 has a tip end portion 21B connected to the stepped bolt 52, the tip end portion 21B being reinforced by a reinforcing member 58. Furthermore, each of the tip end portion 21B and the reinforcing member 58 has a through-hole 60 through which a span 52A of the stepped bolt 52 is extended with a gap left therebetween.

The stepped bolt 52 is fastened by means of a nut 56 to a mounting bracket 54, which is fixedly secured to the reinforcement 40. The span 52A of the stepped bolt 52 allows the hinge 21 to be relatively displaced within the predetermined range in an up-down direction and the longitudinal direction of the vehicle.

The through-hole 60 provided in the tip end portion 21B of the hinge 21 has an elongated shape extending, e.g., in a direction perpendicular to an axis of the stepped bolt 52, namely, in a substantially vertical direction of the vehicle, so as to allow the hinge 21 to make relative displacement at least in the substantially up and down direction of the vehicle. By designing the through-hole 60 to have an increased length, the gap between the tip end portion 21B and the span 52A can be increased, thereby making it possible to extend the range in which the hinge 21 is relatively displaced in the upward direction of the motor vehicle with respect to the stepped bolt 52. Accordingly, if the shape of the through-hole 60 is properly set, it becomes possible to allow the clips 62 to be detached away from the outer hood panel 22 within the range in which the hinge 21 is relatively displaced in the up and down direction of the vehicle with respect to the stepped bolt 52. The shape of the through-hole 60 is not limited to the above, but may, for example, have an increased size in the vehicle width direction to permit relative displacement of the hinge 21 in the vehicle width direction.

Moreover, the hinge 21 may be integrally formed with, e.g., the rear end of the doorframe 46 of the door 18, and is less rigid than the doorframe 46 of the door 18 so that the hinge 21 can be plastically deformed with ease in response to the unfolding of the door 18. In addition, the hinge 21 has a deformable portion 21A as a spare extensible part for securing a deformation stroke thereof. The deformable portion 21A is made extensible by bending the low rigidity portion of the hinge 21 and extends as the door 18 is unfolded. It should be appreciated that the bent shape and the extension amount of the deformable portion 21A are not restricted to the ones illustrated in the drawings.

In the following, description will be given to an operation of the hood airbag device of this embodiment configured as above. First, there will be described a process of mounting the door 18 on the hood 12. Referring to FIG. 3, the door 18 is fabricated by fixing the cover 48 to the doorframe 46 and fixedly securing the reinforcing member 58 to the tip end portion 21B of the hinge 21. The door 18 thus fabricated is fitted into the outer hood panel 22 from thereabove and then the clips 62 are engaged with the peripheral portion 22B around the opening 22A (see FIG. 2). Subsequently, as shown in FIGS. 1 and 3, the stepped bolt 52 is penetrated through the through-hole 60 of the tip end portion 21B of the hinge 21 and fastened into the nut 56 affixed to the mounting bracket 54, thereby attaching the door 18 to the inner hood panel 24. The door 18 is lightweight and therefore can be mounted on the hood 12 with ease.

At this time, the hinge 21 of the door 18 is connected to the stepped bolt 52 in a floating condition and can be relatively displaced within a predetermined range, namely, within the gap between the span 52A and the through-hole 60 and within the length of the span 52A. This makes it possible to finely adjust the position of the door 18. The hinge 21 can make relative displacement with respect to the stepped bolt 52 to thereby accommodate the dimensional deviation between the opening 22A and the door 18 in assembling the door 18 to the hood 12.

Since the door 18 is not a sub-assembly of the airbag module 14, there is no need to take into account the dimensional deviation between the door 18 and the airbag module 14. This makes it possible to keep a good design of the opening 22A of the outer hood panel 22 and that of the door 18 provided on the opening 22A, thus improving the external appearance of the vehicle. Since the door 18 is separate from the airbag module 14, it is possible to reduce the vertical movement of the door 18 due to the vertical vibration of the vehicle as compared with a case where the door 18 is combined with the airbag module 14. This makes it possible to suppress the floating movement of the door 18 as a countermeasure for the vertical vibration.

Next, the process of installing the airbag module 14 into the hood 12 will be described. The airbag module 14 in the form of a sub-assembly is fabricated by fitting the inflator 26 and the airbag 16 into the module case 28. The airbag module 14 is inserted into the hood 12 through the airbag module insertion aperture 70 provided in the inner hood panel 24 such that the flange portions 34F are brought into contact with the inner hood panel 24. Then, the bolts 36 are made to penetrate through the inner hood panel 24 and the reinforcement 40 and fastened into the nuts 38, thus completing the installation process of the airbag module 14.

As clearly shown in FIG. 3, the insertion aperture 70 has a width in the vehicle the longitudinal direction greater than that of the opening 22A of the outer hood panel 22. Not only does this improve the installability of the airbag module 14 but also it allows the airbag module 14 to have an increased front-rear dimension and a relatively low height. Thus, the width of the opening 22A of the outer hood panel 22 in the longitudinal direction of the vehicle may be reduced for the purpose of design, while making the height of the airbag module 14 small, thereby enhancing the installability of the airbag module 14 into the vehicle. For instance, even when the space between the outer hood panel 22 and the inner hood panel 24 is limited due to their positional relationships with components (not shown) in an engine compartment provided below the hood 12, it is possible to install the airbag module 14 into the limited space. In case of the airbag module 14 having an increased dimension in the longitudinal direction of the vehicle, it is preferred that the top portion of the module case 28 has a size equal to or smaller than the width of the opening 22A of the outer hood panel 22 in preparation for the inflation of the airbag 16.

As described above, in the hood airbag device of this embodiment, the door 18 and the airbag module 14 are separately installed into the hood 12, thereby drastically improving the installability of the airbag module 14 and the door 18 into the hood 12.

When the airbag 16 is not deployed, as illustrated in FIG. 2, the door 18 is held in place by the clips 62 at a position where the door 18 closes the opening 22A of the outer hood panel 22, so that the opening 22A remains stably covered by the door 18. Thus, it is possible to maintain the design integrity of the opening 22A and that of the door 18 when the airbag 16 is not deployed.

Next, the operation of the hood airbag device 10 when an impact object collides against the frontal area of the vehicle will be described. In this case, in FIG. 1, the inflator 26 of the hood airbag device 10 is actuated to supply a large quantity of gas into the airbag 16 accommodated within the module case 28 in a collapsed state. In response, the airbag 16 begins to be inflated and the door 18 is unfolded by the force of the inflating airbag 16. The airbag 16 is deployed outside the hood 12 and makes contact with the impact object to absorb the shock.

Specifically, as can be seen in FIG. 2, the inflating force of the airbag 16 is exerted on the door 18 while being inflated. The door 18 is pushed upward by the force of the inflating airbag 16, and the clips 62 are elastically deformed and detached from the outer hood panel 22, so that the door 18 can be unfolded outwards. At this time, the hinge 21 may be displaced relative to the stepped bolt 52 until the lower end of the through-hole 60 reaches the stepped bolt 52. At the position where the lower end of the through-hole 60 rests against the stepped bolt 52, the tip end portion 21B of the hinge 21 is held by the stepped bolt 52. The tip end portion 21B of the hinge 21 is reinforced by the reinforcing member 58 and the stepped bolt 52 is affixed to the reinforcement 40, so that the holding condition of the tip end portion 21B is stably sustained by the stepped bolt 52.

By properly setting the limit of relative displacement of the hinge 21, the clips 62 can be detached away from the outer hood panel 22 while the hinge 21 moves within the relative displacement range. Thus, the presence of the hinge 21 does not hinder the detachment of the clips 62, which makes sure that the clips 62 are smoothly separated from the outer hood panel 22.

As the door 18 is pushed upwardly by the force of the inflating airbag 16, the hinge 21, which is less rigid than the door 18, is plastically deformed so that the door 18 is stably unfolded. Furthermore, the deformation-stroke-securing deformable portion 21A as the spare extensible part is extended in response to the unfolding of the door 18. This allows the door 18 to be reversed onto the outer hood panel 22 about the hinge 21, after the door 18 has been pushed upwards and all of the clips 62 have separated from the outer hood panel 22. Further, the clips 62 can be detached in a reliable manner, so that the door 18 can be unfolded smoothly (the unfolded state thereof is not shown in the drawings). Once the door 18 is unfolded, and the opening 22A opened, the airbag 16 can be deployed outside the hood 12 through the opening 22A.

Although the stepped bolt 52 is taken as one example of connector members in the aforementioned embodiment, the connector members are not limited to the stepped bolt 52 but any appropriate connector member may be used that allows the hinge 21 to be connected the connector member in a floating condition. Likewise, the door 18 is not restricted to the aforementioned one formed by fixing the cover 48 to the doorframe 46. For example, the doorframe 46 itself may cover up the opening 22A of the outer hood panel 22 without using the cover 48.

Figure 4:
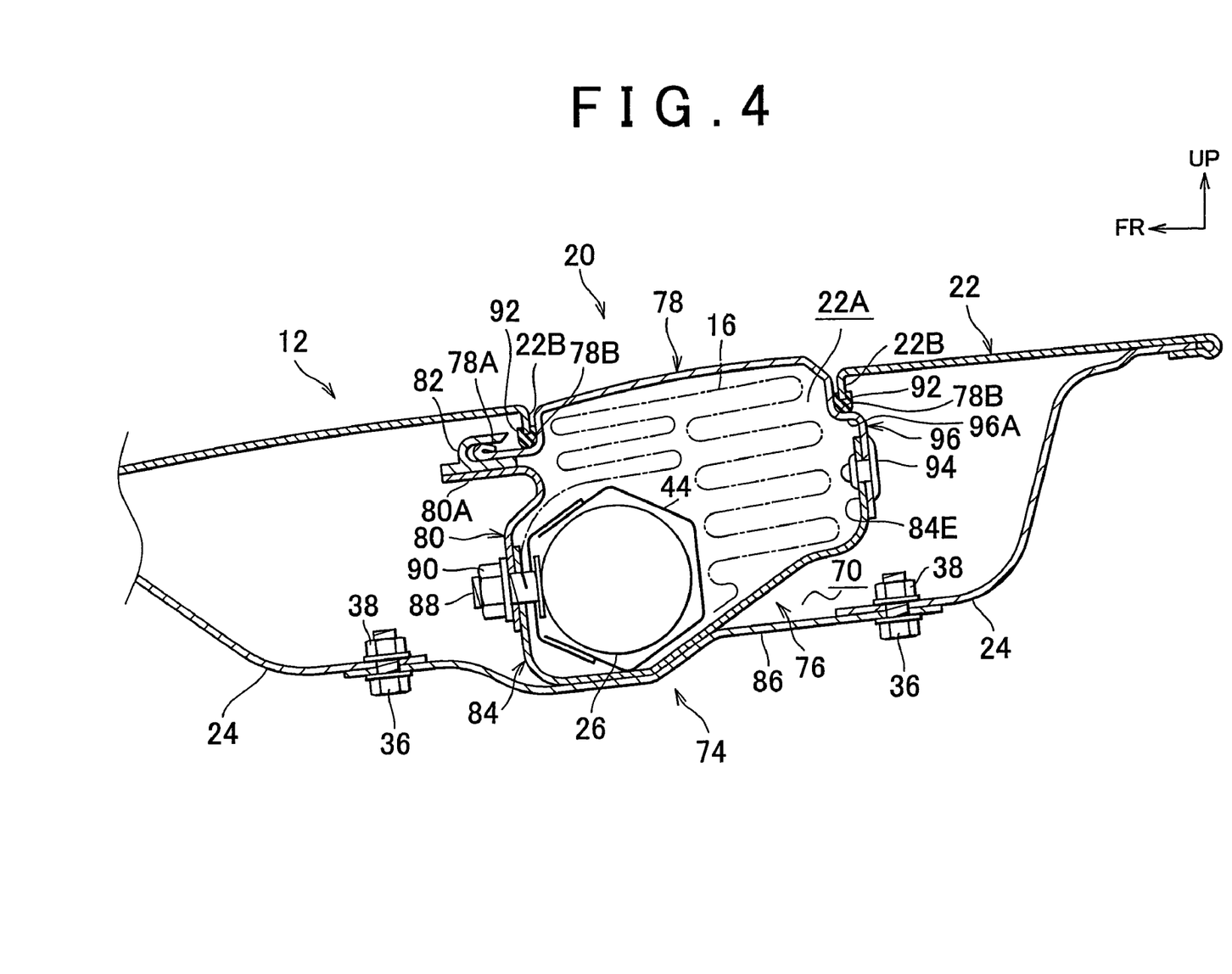
FIG. 4 is a cross-sectional view of a hood airbag device in accordance with a second embodiment of the present invention when the airbag is not deployed, which is taken along a line passing through a hinge in a longitudinal direction of the vehicle.

Referring to FIG. 4, a hood airbag device 20 in accordance with a second preferred embodiment is provided on, e.g., the front hood 12 of the vehicle and includes an airbag module 74 and a door 78.

The airbag module 74 has an airbag 16 that can be deployed by the gas supplied from an inflator 26. The airbag module 74 is inserted between an outer hood panel 22 and an inner hood panel 24 of the hood 12 from below the inner hood panel 24 to be fixed thereto. The airbag 16 and the inflator 26 are all accommodated within a module case 76. The airbag 16 is configured such that it can be inflated by the gas supplied from the inflator 26 and then deployed outside the hood 12 through an opening 22A of the outer hood panel 22.

The module case 76 is a box-like member that opens toward the opening 22A of the outer hood panel 22 and is extended in a width direction of the vehicle. More specifically, the module case 76 includes a bottom member 84 formed into a generally box-like shape and a wall member 80 fixed to the front side of the bottom member 84 by, e.g., welding. Fixedly secured to a top edge 80A of the wall member 80 is a clip 82 for holding a frontal edge 78A of the door 78. A mounting bracket 86 is affixed to the bottom member 84. The mounting bracket 86 extends beyond the bottom member 84 in a front direction as well as in a rear direction of the vehicle. To be more specific, the mounting bracket 86 extends in the longitudinal direction of the vehicle longer than the longitudinal width of an insertion aperture 70. The airbag module 74 is attached to the inner hood panel 24 through the mounting bracket 86 by using bolts 36 and nuts 38.

The inflator 26 includes a mounting bracket 44 having a male threaded portion 88 extended through the bottom member 84 and the wall member 80. By tightening a nut 90 onto the male threaded portion 88, the inflator 26 is fixed to the module case 76 and the bottom member 84 and the wall member 80 are also fastened together.

Figure 5:
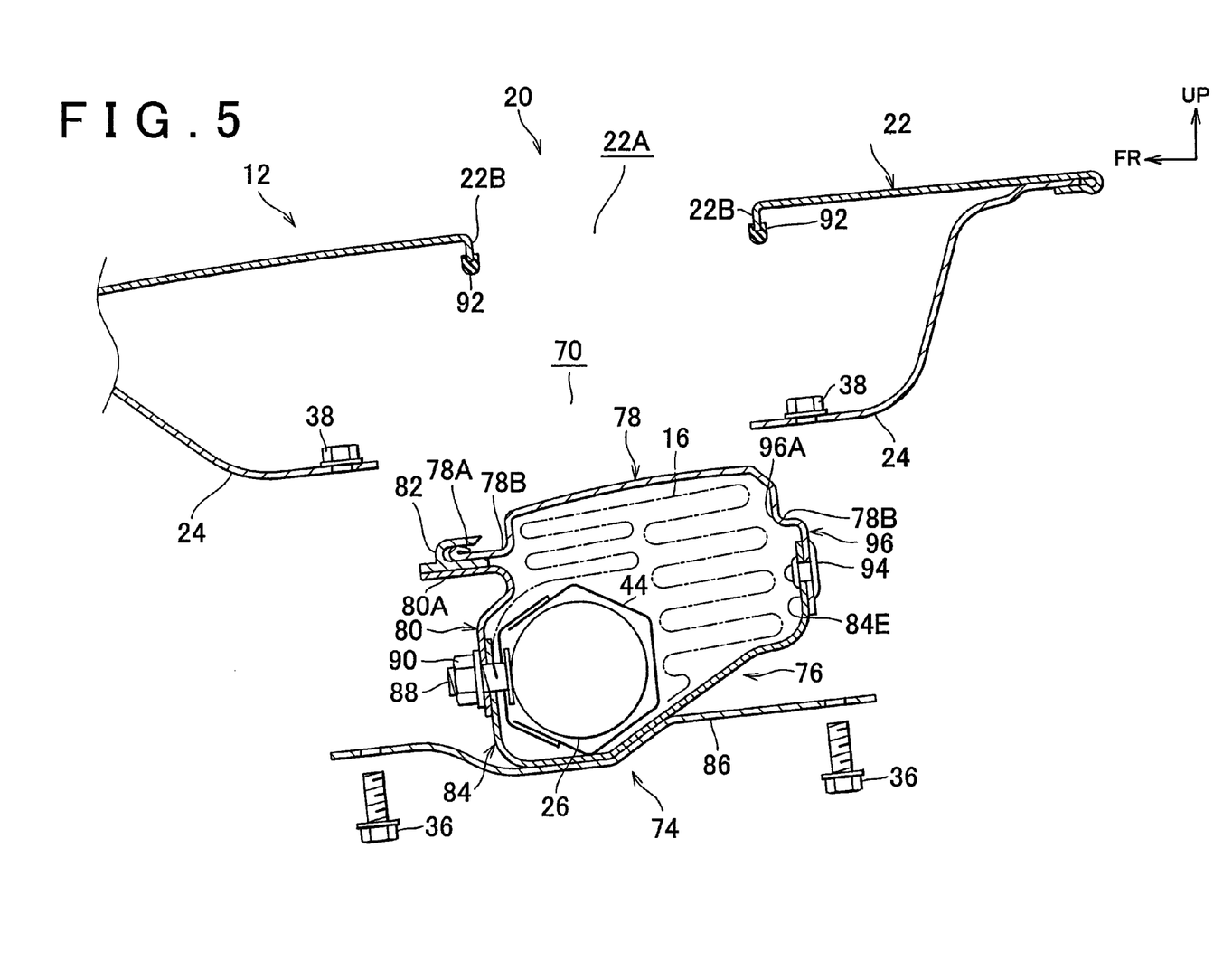
FIG. 5 is an exploded cross-sectional view depicting the hood airbag device of the second embodiment, which is taken along the line passing through the hinge in the longitudinal direction of the vehicle.

As illustrated in FIG. 5, the door 78 is pre-assembled to the airbag module 74 and closes an opening 22A formed in the outer hood panel 22 that is aligned to correspond to the airbag module 74. The door 78 is configured such that, when the airbag 16 is inflated, it can be unfolded and opened by the force of the inflating airbag 16 to open the opening 22A. The door 78 has a sealing surface 78B, and a sealing member 92 is disposed between the sealing surface 78B and the peripheral edge 22B of the opening 22A. Specifically, the door 78 is provided at its rear end with a hinge 96, which is fixed to a rear wall 84E of the bottom member 84 by, e.g., a rivet 94. The frontal edge 78A of the door 78 is held in place by the clip 82 provided at the top edge 80A of the wall member 80. The sealing member 92 may be, for example, a rubber seal for improving water-tightness between the door 92 and the outer hood panel 22.

The hinge 96 is less rigid than the door 78 so that it can be plastically deformed with ease in response to the unfolding of the door 78. In addition, the hinge 96 has a deformable portion 96A as a spare extensible part for securing a deformation stroke thereof. The deformable portion 96A is made extensible by bending the low rigidity portion of the hinge 96 and is made to extend as the door 78 is unfolded. It should be appreciated that the bent shape and the extension amount of the deformable portion 96A are not limited to the ones illustrated in the drawings.

As depicted in FIG. 5, although the sealing member 92 is provided along the peripheral edge 22B of the opening 22A of the outer hood panel 22, prior to the airbag module 74 is installed in the hood 12, the present invention is not limited thereto. Instead, the sealing member 92 may be provided on the airbag module 74, i.e., on the sealing surface 78B of the door 78.

In this embodiment, no reinforcement is employed for the reason that the outer hood panel 22 and the inner hood panel 24 are connected to, and reinforce, each other through the airbag module 74 assembled thereto. However, the present invention is not limited to the above, and a reinforcement may be added thereto as in the first embodiment shown in FIGS. 1 to 3. In such a case, the mounting bracket 86 may be fastened to the inner hood panel 24 together with the reinforcement by means of bolts 36 and nuts 38.

Because the other parts or components are the same as those of the first embodiment, they are denoted by like reference numerals and descriptions thereon will be omitted.

In the following, the operation of the hood airbag device 20 of this embodiment configured as above will be described. The process of installing the airbag module 74 into the hood 12 will be described with reference to FIG. 5. The airbag module 74 in the form of a sub-assembly is fabricated by fitting the inflator 26 and the airbag 16 into the module case 76. The airbag module 74 is inserted into the hood 12 through the airbag module insertion aperture 70 provided in the inner hood panel 24 such that the mounting bracket 86 is brought into contact with the inner hood panel 24. Then, the bolts 36 are made to penetrate through the inner hood panel 24 and fastened into the nuts 38, whereby the door 78 closes the opening 22A and the sealing surface 78B makes a contact with the sealing member 92, thus completing the installation process of the airbag module 74.

As set forth above, in the hood airbag device 20 of this embodiment, the airbag module 74 having the door 78 pre-assembled thereto is inserted and installed into the hood 12 from below the inner hood panel 24, so that it is possible to prevent the external surface of the outer hood panel 22 from being damaged during the installation process, thereby keeping a good design integrity of the hood 12 and improving the external appearance of the vehicle. Furthermore, because the sealing member 92 is disposed between the peripheral edge 22B of the opening 22A and the sealing surface 78B of the door 78, the door 78 is not damaged when the airbag module 74 is inserted into the hood 12 from below the inner hood panel 24.

Next, the operation of the hood airbag device of this embodiment when an impact object collides against the frontal area of the vehicle will be described. Referring to FIG. 4, in this case, the inflator 26 of the hood airbag device 20 is actuated to supply a large quantity of gas into the airbag 16 accommodated within the module case 76 in a collapsed state, so that the airbag 16 begins to be inflated and the door 78 is unfolded by the force of the inflating airbag 16. Then, the airbag 16 is deployed outside the hood 12 and makes contact with the impact object to absorb the shock.

More specifically, as the airbag 16 is inflated and the force of the inflating airbag 16 pushes the door 78 upward, the frontal edge 78A of the door 78 is plastically deformed and separated from the clip 82, unfolding the door 78. As the door 78 unfolds, the hinge 96, which is less rigid than the door 78, is plastically deformed to stably keep the unfolding of the door 78. Furthermore, the deformation-stroke-securing deformable portion 96A as the spare extensible part is extended in response to the unfolding of the door 78. This allows the door 78 to be reversed onto the outer hood panel 22 about the hinge 96, after the frontal edge 78A of the door 78 has been separated from the clip 82. Accordingly, it is possible to unfold the door 78 smoothly (the unfolded state of the door is not shown in the drawings). Once the door 78 is unfolded to thereby open the opening 22A, the airbag 16 can be expanded and deployed outside the hood 12 through the opening 22A.

While the invention has been shown and described with respect to the preferred embodiments, it will be understood by those skilled in the art that various changes and modification may be made without departing from the scope of the invention as defined in the following claims.

The invention claimed is:

1. A hood airbag device for use in a vehicle, comprising:
an airbag module having an inflator and an airbag that is deployed by a gas supplied from the inflator, the airbag module inserted between an outer hood panel and an inner hood panel of a hood through the inner hood panel, the airbag module installed on a reinforcement and the inner hood panel, the reinforcement connecting the inner hood panel with the outer hood panel and reinforcing the hood; and
a door that covers an opening formed in the outer hood panel that is aligned to correspond to the airbag module, the door held in place on a peripheral portion around the opening in such a manner that, when the airbag is inflated, the door is unfolded and opened by an inflating force of the airbag, wherein:
the door has a hinge for supporting the door when the door is unfolded;
the hinge, which is less rigid than the door, is plastically deformed with ease in response to the unfolding of the door and is provided with a deformable portion as a spare extensible part for securing a deformation stroke thereof; and
the hinge is connected to the reinforcement by means of a connector member such that the hinge is relatively displaceable within a predetermined range with respect to the reinforcement.

2. The hood airbag device according to claim 1, wherein the connector member is a stepped bolt provided on the reinforcement, and
wherein a tip end portion of the hinge, which is connected to the stepped bolt, has a through-hole through which the stepped bolt is extended with a gap left therebetween.

3. The hood airbag device according to claim 2, wherein the through-hole has an elongated shape extending in a substantially vertical direction of the vehicle.

4. The hood airbag device according to claim 1, wherein the door is held in place by a plurality of clips at a position where the door closes the opening of the outer hood panel, and
wherein, when the airbag is inflated, the clips are detached away from the outer hood panel while the hinge moves within the predetermined range.

5. A hood airbag device for use in a vehicle, comprising:
an airbag module having an inflator and an airbag that is deployed by a gas supplied from the inflator, the airbag module inserted between an outer hood panel and an inner hood panel of a hood through the inner hood panel, the airbag module installed on the inner hood panel; and a door, pre-assembled to the airbag module, that closes an opening formed in the outer hood panel that is aligned to correspond to the airbag module, wherein the door is adapted to unfold and open by an inflating force of the airbag when the airbag is deployed and has a sealing surface formed in such a manner that a sealing member is disposed between the sealing surface and a peripheral edge of the opening.

6. The hood airbag device according to claim 5, wherein the door has a hinge for supporting the door when the door is unfolded, the hinge, which is less rigid than the door, is plastically deformed with ease in response to the unfolding of the door and is provided with a deformable portion as a spare extensible part for securing a deformation stroke thereof; the hinge is connected to the airbag module.

7. The hood airbag device according to claim 5, further comprising a reinforcement that connects the inner hood panel with the outer hood panel and that reinforces the hood, the airbag module installed on the reinforcement and the inner hood panel.

8. The hood airbag device according to claim 7, wherein the inner hood panel and the reinforcement have an insertion aperture through which the airbag module is inserted and installed in place, wherein the insertion aperture is larger in a longitudinal direction of the vehicle than the width of the opening of the outer hood panel.

9. The hood airbag device according to claim 7, wherein:
a module case of the airbag module has a front-side wall member, a rear-side wall member and a bottom member;
a mounting bracket extending beyond the bottom member in a front direction and a rear direction of the vehicle is affixed to the bottom member; and
a front end and a rear end of the mounting bracket are fastened to the inner hood panel together with the reinforcement.

10. The hood airbag device according to claim 5, wherein the inner hood panel has an insertion aperture through which the airbag module is inserted and installed in place, the insertion aperture having a greater size in the longitudinal direction of the vehicle than the width of the opening of the outer hood panel.

11. The hood airbag device according to claim 10, wherein, after the airbag module is inserted and installed in place, and before the airbag is deployed, a width of a topmost surface of the airbag is equal to or less than the width of the opening of the outer hood panel in the longitudinal direction of the vehicle.

12. The hood airbag device according to claim 5, wherein:
a module case of the airbag module has a front-side wall member, a rear-side wall member and a bottom member;
a mounting bracket extending beyond the bottom member in a front direction and a rear direction of the vehicle is affixed to the bottom member; and
a front end and a rear end of the mounting bracket are fastened to the inner hood panel.

13. A hood airbag device for use in a vehicle, comprising:
an airbag module having an inflator and an airbag that is deployed by a gas supplied from the inflator, the airbag module inserted between an outer hood panel and an inner hood panel of a hood through the inner hood panel, the airbag module installed on a reinforcement and the inner hood panel, the reinforcement connecting the inner hood panel with the outer hood panel and reinforcing the hood; and
a door that covers an opening formed in the outer hood panel that is aligned to correspond to the airbag module, the door held in place on a peripheral portion around the opening in such a manner that, when the airbag is inflated, the door is unfolded and opened by an inflating force of the airbag, wherein:
a module case of the airbag module has a front-side wall member, a rear-side wall member and a bottom member;
the bottom member is provided with flange portions respectively extending in the forward direction of the vehicle from the front-side wall member and in the rearward direction of the vehicle from the rear-side wall member; and
the flange portions are fastened to the inner hood panel together with the reinforcement.

14. The hood airbag device according to claim 13, wherein:
a recessed portion is provided on the bottom of the bottom member and recessed downwardly;
a part of the inflator is accommodated in the recessed portion; and
the recessed portion protrudes below the inner hood panel.

15. A hood airbag device for use in a vehicle, comprising:
an airbag module having an inflator and an airbag that is deployed by a gas supplied from the inflator, the airbag module inserted between an outer hood panel and an inner hood panel of a hood through the inner hood panel, the airbag module installed on a reinforcement and the inner hood panel, the reinforcement connecting the inner hood panel with the outer hood panel and reinforcing the hood; and
a door that covers an opening formed in the outer hood panel that is aligned to correspond to the airbag module, the door held in place on a peripheral portion around the opening in such a manner that, when the airbag is inflated, the door is unfolded and opened by an inflating force of the airbag,
wherein the inner hood panel and the reinforcement have an insertion aperture through which the airbag module is inserted and installed in place, wherein the insertion aperture is larger in a longitudinal direction of the vehicle than the width of the opening of the outer hood panel.

* * * * *